J. BOOTH.
SWINGING MIRROR SUPPORT FOR DRESSERS.
APPLICATION FILED JUNE 8, 1912.
1,088,765.
Patented Mar. 3, 1914.
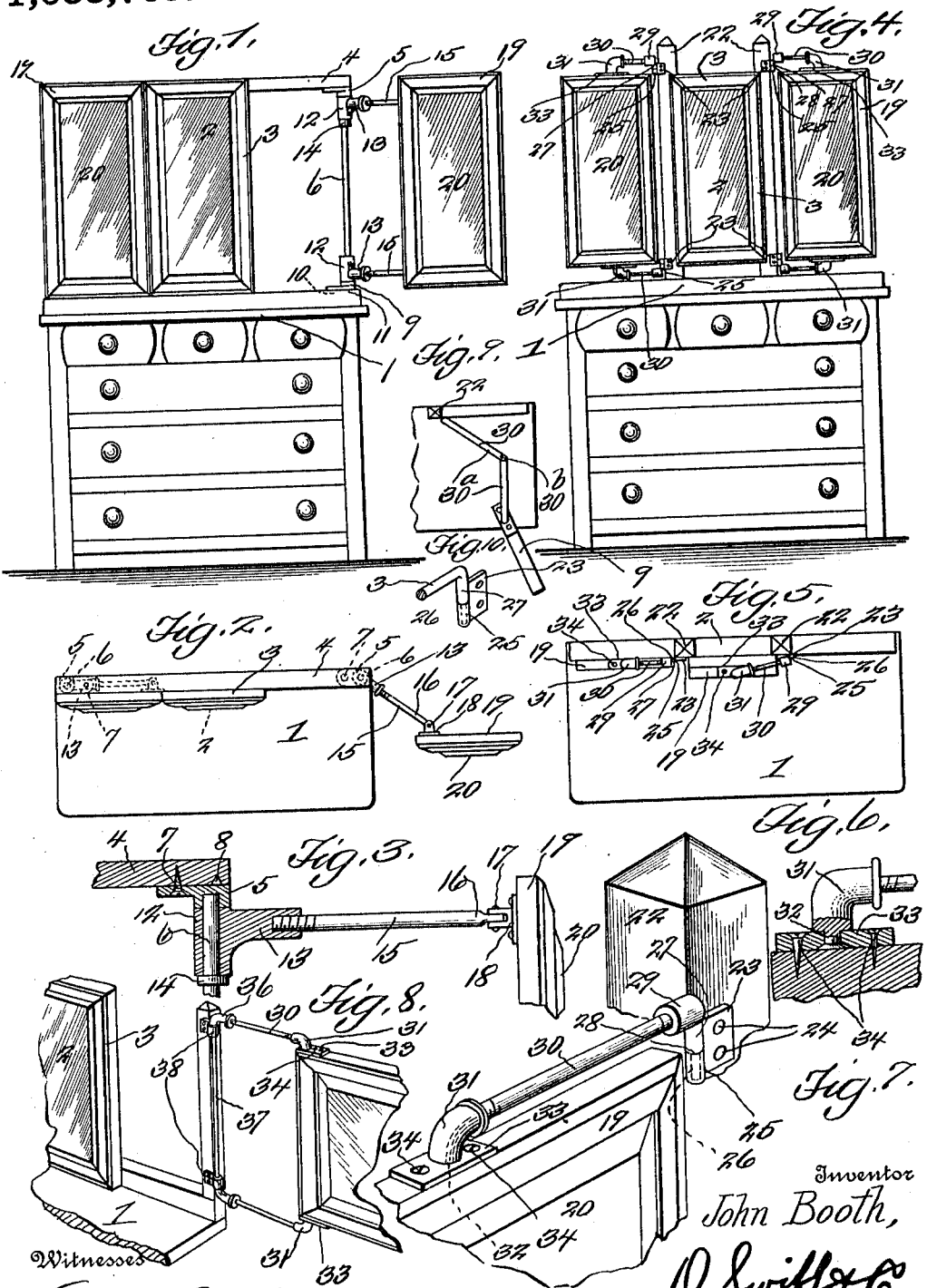

UNITED STATES PATENT OFFICE.

JOHN BOOTH, OF PERU, INDIANA.

SWINGING-MIRROR SUPPORT FOR DRESSERS.

1,088,765.  Specification of Letters Patent.  Patented Mar. 3, 1914.

Application filed June 8, 1912. Serial No. 702,440.

*To all whom it may concern:*

Be it known that I, JOHN BOOTH, a citizen of the United States, residing at Peru, in the county of Miami and State of Indiana, have invented a new and useful Swinging-Mirror Support for Dressers; and I do hereby declare the following to be a full, clear, and exact description of the invention, such as will enable others skilled in the art to which it appertains to make and use the same.

This invention relates to a new and useful swinging mirror support for dressers and the like, and one which will permit the mirror to be arranged in various positions.

The principal object of the invention is to provide a device of this nature in which essential desirable and practical features of construction exist.

The features of construction are hereinafter set forth, shown in the drawings and claimed.

In the drawings: Figure 1 is a view in elevation of a dresser, showing the improved swinging mirror support. Fig. 2 is a plan view. Fig. 3 is a detail view in elevation and partly in section of one of the supports. Fig. 4 is a view in elevation of a dresser showing a modified structure of swinging mirror support. Fig. 5 is a plan view of Fig. 4. Fig. 6 is a detail sectional view of one end of one of the supports shown in Figs. 4 and 5. Fig. 7 is a detail perspective view of one of the supports shown in Fig. 4. Fig. 8 is a detail fragmentary view in perspective showing a modified structure of support. Fig. 9 is a detail plan view of a dresser, showing the fact that the rods 30 may be constructed in two parts. Fig. 10 is a detail view showing one of the parts of one of the rods merging integral into one of the bodies 27.

Referring to Figs. 1, 2 and 3, 1 designates the dresser having a central stationary mirror 2 with frame 3. A supporting strip 4 extends transversely of the upper end portion of the frame 3 of the mirror 2. Each end of this supporting strip is provided with a socket plate 5, to receive the upper ends of the rod 6. The socket plates 5 are secured in place by the screws 7, and are provided with lugs 8 to embed in the supporting strip 4 so as to prevent the socket plates 5 from turning. The lower end portions of the rods 6 are received in the socket plates 9, which are similar to the socket plates 5, and are secured in position by the screws 10 and lugs 11. Revolubly sleeved upon the rods 6 are the sleeves 12 having the bracket arm 13. The upper sleeve 12 is supported in position by the collar 14. Threaded into the bracket arm 13 are the rods 15, the end portions 16 of which are pivoted at 17 in the bracket plates 18 of the frame 19 of the mirrors 20. By this construction it will be seen that the mirrors 20 may be swung to various positions, such as shown in Figs. 1, 2 and 3.

Referring to Figs. 4 and 5 the dresser 1 is provided with two uprights 22, to which the mirror 2 having the frame 3 is secured in suitable manner. Plates 23 are bolted or otherwise secured as at 24 to the uprights 22. The plates 23 are provided with cylinders 25, into which the pins 26 extend. The pins 26 as shown in Fig. 7 project from bodies 27, which engage the upper portions of the cylinders 25, as shown at 28. The bodies 27 form a part of the thimbles 29, into which the rods 30 are threaded. The outer end portions of the rods 30 are threaded into the elbow members 31, which are swiveled at 32 to the plates 33, which in turn are secured by means of the screws 34 to the frames 19 of the mirrors 20.

From the description of the structure shown in Figs. 4, 5, 6 and 7 it will be noted that the mirror 20 may be easily and quickly adjusted to various positions. In Fig. 8 however, the rods 30 are threaded into the elbows 36, which in turn are threaded to the upper and lower ends of the rod 37, which is journaled in the bracket bearings 38. The elbows 36 engage the bracket bearings as shown. Also in Fig. 8 the bracket bearings are secured to a single post, and the elbows 31 are swiveled to the plates 33 in the same manner as that shown in Figs. 6 and 7. This improved swinging mirror support is an improvement upon the swinging mirror support disclosed in the co-pending application filed Jan. 5, 1912, Serial No. 669,570.

In Fig. 9 the rods 30 are shown as constructed in two parts 30$^a$ pivoted together at 30$^b$. Also in Fig. 9 and in Fig. 10 the parts 29 and 31 are eliminated.

The invention having been set forth, what is claimed as new and useful is:—

In combination with a dresser having a centrally arranged mirror, a strip extending transversely of the upper portion of the mirror and beyond the same on each side forming arms, a socket plate secured to the under face of each arm at the end thereof, a socket plate secured to the base of the dresser on each side of the centrally arranged mirror and axially arranged with the first socket plate, a rod swivelly mounted in each two axially arranged socket plates, the upper socket plate with the arm acting to prevent vertical movement of the rod, a pair of sleeves swiveled on the rod, each adjacent each socket plate, a collar integrally fast on the rod to support the upper sleeve, said socket plates having lugs embedding into the arm and the base of the dresser to prevent movement of the socket plates, means for securing the socket plates to the arm and base, and a swinging end mirror having rod connections to said sleeves.

In testimony whereof I have signed my name to this specification in the presence of two subscribing witnesses.

JOHN BOOTH.

Witnesses:
WILLIAM E. MOWBRAY,
E. LANTZ.

---

Copies of this patent may be obtained for five cents each, by addressing the "Commissioner of Patents, Washington, D. C."